(12) United States Patent
Otsuki et al.

(10) Patent No.: US 8,938,316 B2
(45) Date of Patent: Jan. 20, 2015

(54) NUMERICAL CONTROLLER WITH MACHINING TIME PREDICTION UNIT AND MACHINING ERROR PREDICTION UNIT

(75) Inventors: Toshiaki Otsuki, Minamitsuru-gun (JP); Osamu Hanaoka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 510 days.

(21) Appl. No.: 13/403,006

(22) Filed: Feb. 23, 2012

(65) Prior Publication Data

US 2012/0296462 A1 Nov. 22, 2012

(30) Foreign Application Priority Data

May 20, 2011 (JP) .................................. 2011-113927

(51) Int. Cl.
G06F 19/00 (2011.01)
G05B 19/4069 (2006.01)
G06G 7/48 (2006.01)

(52) U.S. Cl.
CPC .. *G05B 19/4069* (2013.01); *G05B 2219/35346* (2013.01); *G05B 2219/36219* (2013.01); *G05B 2219/36252* (2013.01)
USPC ........... 700/160; 700/174; 700/186; 700/188; 700/189; 700/192; 703/4; 703/13; 703/19

(58) Field of Classification Search
CPC ................. G05B 19/4069; G05B 2219/36252; G05B 19/36219; G05B 2219/35346
USPC ................. 700/159–160, 173–174, 181, 186, 700/188–190, 192; 703/4, 13, 19, 22
See application file for complete search history.

(56) References Cited

U.S. PATENT DOCUMENTS 3,418,549 A * 12/1968 Emerson ......................... 318/39
4,543,625 A 9/1985 Nozawa et al.
(Continued)

FOREIGN PATENT DOCUMENTS

CN 102019564 A 4/2011
DE 34 08 523 A1 9/1985
(Continued)

OTHER PUBLICATIONS

Yan Yao, et al., "Prediction of Technology Effects of CNC Milling Parameters Based on Neural Network," Mining & Processing Equipment, Mar. 31, 2011, vol. 39, No. 3, pp. 105-109.

*Primary Examiner* — Ramesh Patel
(74) *Attorney, Agent, or Firm* — Drinker Biddle & Reath LLP

(57) ABSTRACT

In connection with a machining program used in machining a workpiece by means of a machine tool controlled by a numerical controller, interpolation data, a command position point sequence, and a servo position point sequence for each processing period are determined by simulation by designating speed data for giving a machining speed and precision data for giving a machining precision. A predicted machining time for workpiece machining is determined based on the determined interpolation data, and a predicted machining error for workpiece machining is determined based on the determined command and servo position point sequences. Further, the precision data and the speed data are determined for the shortest predicted machining time within a preset machining error tolerance, based on a plurality of predicted machining times and a plurality of predicted machining errors.

7 Claims, 12 Drawing Sheets

(56) References Cited

U.S. PATENT DOCUMENTS

| | | | |
|---|---|---|---|
| 4,740,885 A | 4/1988 | Gose et al. | |
| 4,833,617 A * | 5/1989 | Wang | 700/173 |
| 4,894,596 A * | 1/1990 | Hara | 318/568.1 |
| 6,163,124 A * | 12/2000 | Ito et al. | 318/567 |
| 7,167,772 B2 | 1/2007 | Hioki et al. | |
| 8,018,192 B2 | 9/2011 | Iwashita et al. | |
| 2003/0033105 A1* | 2/2003 | Yutkowitz | 702/105 |
| 2004/0193385 A1* | 9/2004 | Yutkowitz | 702/151 |
| 2005/0228533 A1* | 10/2005 | Hioki et al. | 700/159 |
| 2010/0087948 A1* | 4/2010 | Yamaguchi | 700/178 |
| 2011/0057599 A1 | 3/2011 | Iwashita et al. | |

FOREIGN PATENT DOCUMENTS

| | | |
|---|---|---|
| DE | 10 2007 045 593 A1 | 3/2009 |
| JP | 58-35607 | 3/1983 |
| JP | 63-21922 B | 5/1988 |
| JP | 2001-125613 A | 5/2001 |
| JP | 2004-227028 | 8/2004 |
| JP | 2005-301440 | 10/2005 |
| JP | 2011-60016 | 3/2011 |
| WO | WO 2010/134199 A | 11/2010 |

* cited by examiner

| SPEED-ORIENTED/ PRECISION-ORIENTED | SPEED-ORIENTED ←——————————————————→ PRECISION-ORIENTED | | | | | | | | |
|---|---|---|---|---|---|---|---|---|---|
| PRECISION DATA / MACHINING CONDITION DATA | 1 | 2 | 3 | 4 | 5 | 6 | 7 | 8 | 9 | 10 |
| ALLOWABLE ACCELERATION (mm/sec²) | 2000 | ←—————— (PROPORTIONAL DISTRIBUTION) ——————→ | | | | | | | | 600 |
| ALLOWABLE CORNER SPEED DIFFERENCE (mm/min) | 1000 | ←—————— (PROPORTIONAL DISTRIBUTION) ——————→ | | | | | | | | 400 |

```
<PROGRAM COMMANDS>

G05.1Q1Rr ;   MACHINING CONDITION
              SELECTION COMMAND    (r = 1 to 10)
X... Y... Z... F... ;  ⎤
X... Y... Z... ;       ⎬ MACHINING COMMANDS
X... Y... Z... ;       ⎦
```

| PRECISION DATA / SPEED DATA (OVERRIDE) | 9 |
|---|---|
| 50% | 181.4(min) |
| | 0.016(mm) |

FIG. 14

| PRECISION DATA / SPEED DATA (PARAMETER SET SPEED) (mm/min) | 1 | 2 | 3 | 4 | 5 | 6 | 7 | 8 | 9 | 10 |
|---|---|---|---|---|---|---|---|---|---|---|
| 1000 | 150.2 / 0.08 | 154.1 / 0.072 | 158 / 0.064 | 161.9 / 0.056 | 165.8 / 0.048 | 169.7 / 0.04 | 173.6 / 0.032 | 177.5 / 0.024 | 181.4 / 0.016 | 185.3 / 0.008 |
| 1500 | 135.1 / 0.118 | 140.3 / 0.104 | 145.4 / 0.091 | 150.6 / 0.077 | 155.8 / 0.063 | 158.5 / 0.053 | 161.1 / 0.043 | 163.8 / 0.032 | 166.4 / 0.022 | 169.1 / 0.012 |
| 2000 | 120 / 0.156 | 126.4 / 0.136 | 132.9 / 0.117 | 139.3 / 0.097 | 145.8 / 0.077 | 147.2 / 0.065 | 148.6 / 0.053 | 150 / 0.041 | 151.4 / 0.029 | 152.8 / 0.017 |
| 2500 | 104.8 / 0.193 | 109.8 / 0.172 | 114.7 / 0.151 | 119.6 / 0.129 | 124.6 / 0.108 | 127 / 0.091 | 129.4 / 0.073 | 131.8 / 0.056 | 134.2 / 0.038 | 136.6 / 0.021 |
| 3000 | 89.7 / 0.231 | 93.1 / 0.208 | 96.5 / 0.185 | 99.9 / 0.162 | 103.3 / 0.139 | 106.7 / 0.117 | 110.1 / 0.094 | 113.5 / 0.071 | 116.9 / 0.048 | 120.3 / 0.025 |

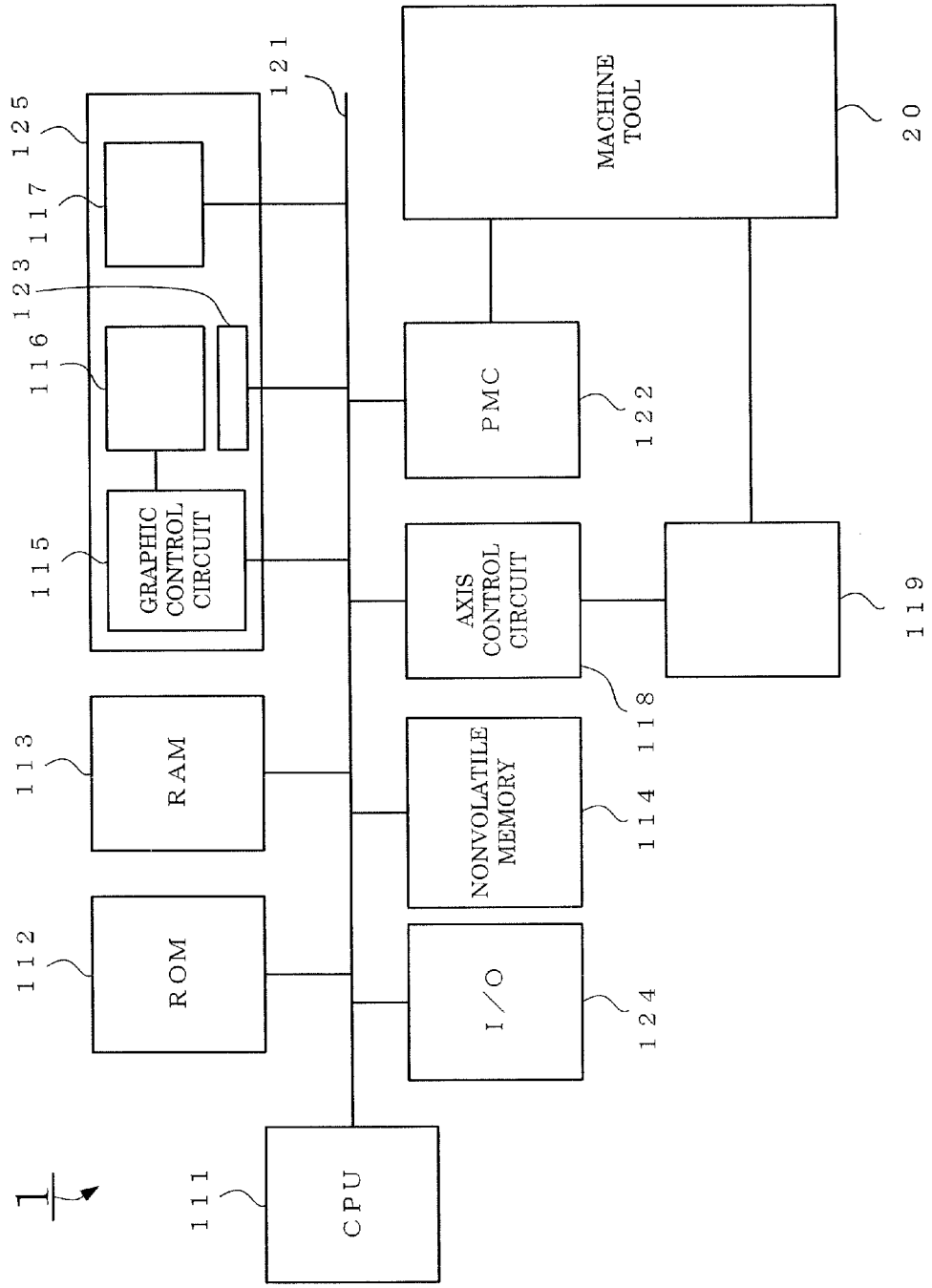

NUMERICAL CONTROLLER WITH MACHINING TIME PREDICTION UNIT AND MACHINING ERROR PREDICTION UNIT

RELATED APPLICATION DATA

This application claims priority under 35 U.S.C. §119 and/or §365 to Japanese Application No. 2011-113927 filed May 20, 2011, the entire contents of which is incorporated herein by reference.

BACKGROUND OF THE INVENTION

1. Field of the Invention

The present invention relates to a numerical controller with a machining time prediction unit and a machining error prediction unit.

2. Description of the Related Art

In machining a workpiece using a machine tool, in general, if the machining time is reduced or if the machining speed is increased, the machining precision is degraded. If the machining time is increased or if the machining speed is reduced, in contrast, the machining precision is improved. In the workpiece machining, the machining precision is more important than the machining time. Thus, users who use the machine tool to machine the workpiece wish to be able to machine the workpiece in a minimum machining time with a machining precision within a preset machining error tolerance. It is not easy, however, to ascertain the appropriate machining time and machining error level for the workpiece.

Accordingly, machining is normally performed at a speed within an allowable precision range after trial machining is performed several times for a somewhat longer time. Before machining a workpiece, therefore, users wish to know by simulation how precisely the workpiece will be machined with the machining speed and machining conditions without trial machining. Further, users earnestly wish to know by simulation the machining speed and machining conditions with which the workpiece can be machined with a machining precision within a machining error tolerance in a minimum machining time without trial machining.

Principal prior art techniques related to machining time prediction are disclosed in the following patent documents.

(a) Japanese Patent Application Laid-Open No. 2004-227028 (corresponding to U.S. Unexamined Patent Publication No. US2005/0228533A1) discloses a technique in which a machining program is divided into machining processes by simulation, a cycle time is calculated for each of the divided machining processes, and information on the result of the simulation is displayed on a display unit of terminal equipment. Further, Japanese Patent Application Laid-Open No. 2005-301440 discloses a machining time calculator, which can quickly calculate an accurate axis movement time even in machining using a numerical controller having a function to optimally adjust the feed rate and acceleration/deceleration.

Although the machining time is predicted in the techniques disclosed in the above two patent documents, machining errors are not predicted. Therefore, these techniques cannot meet users' demand to know by simulation the precision of the workpiece with the machining speed without trial machining or to know by simulation the machining speed at which the workpiece can be machined with a precision within a machining error tolerance in a minimum machining time without trial machining.

(b) Japanese Patent Application Laid-Open No. 58-35607 (corresponding to U.S. Pat. No. 4,543,625) discloses a numerical controller capable of restricting a machining error in corner cutting and a radial error in circular-arc cutting to tolerances.

In the technique disclosed in the above patent document, the machining error is calculated based on the premise that acceleration/deceleration is performed with exponential characteristics. In modern numerical controllers, however, complicated speed control is performed for smooth acceleration/deceleration characteristics, such as linear and bell-shaped acceleration/deceleration characteristics, as well as the exponential acceleration/deceleration characteristics. Thus, the machining error cannot be predicted by a simple computational formula described in this patent document.

(c) Japanese Patent Application Laid-Open No. 2011-60016 (corresponding to U.S. Unexamined Patent Publication No. US2011/0057599A1) discloses a trajectory display device having a function to accurately quantify an error of a three-dimensional trajectory of a machine tool and display or output the error.

The trajectory display device disclosed in the above patent document comprises a command line segment definition unit and an error calculation unit. The command line segment definition unit defines command line segments that each connect two adjacent points for each command position point. The error calculation unit calculates, as an error of an actual position at each time relative to a command path, the length of the shortest of perpendicular lines drawn from the actual position to the command line segments, individually, or the length of a line segment that connects the actual position and the command position closest to it, whichever is shorter. Data on the actual position is determined by actually operating a drive shaft (servo), not by simulation.

The technique disclosed in the above patent document will now be described with reference to FIG. 1. In this technique, a length from an actual position $Q_m''$ (m=1, 2, . . . ) to a command position $P_n$ (n=1, 2, . . . ) is regarded as an error. In some other case, in contrast, a length from the command position $P_n$ to the actual position $Q_m''$ should be regarded as an error. In machining, for example, a right-angled corner by the technique disclosed in this patent document, as shown in FIG. 1, lengths from actual positions to command positions (indicated by broken lines) are regarded as errors. In this case, however, the length of a perpendicular line (indicated by a dash-dotted line) drawn from a command position $P_4$ at the corner to a line segment that connects actual positions $Q_4''$ and $Q_5''$ is greater. Therefore, the length of this perpendicular line should be regarded as an error. Thus, there is also a case where the length from the command position to the actual position should be regarded as an error, so that the method of error evaluation disclosed in this patent document is unsatisfactory.

According to the technique disclosed in this patent document, moreover, the error is only calculated and displayed or output. Therefore, this technique cannot meet users' demand to know by simulation the precision of the workpiece with the machining speed and machining conditions without trial machining or to determine by simulation the machining speed and machining conditions with which the workpiece can be machined with a precision within a machining error tolerance in a minimum machining time without trial machining.

Conventionally, a numerical controller has a machining condition selecting function. According to this function, machining condition data, including an allowable acceleration and allowable corner speed difference shown in FIG. 2, are previously set as parameters, and the precision data to be used for machining are designated as Rr (r=1 to 10) in the G05.1 block of the program shown in FIG. 3

According to the method shown in FIG. 2, the machining condition data (including allowable acceleration and allowable corner speed difference) are previously set for each of the cases of speed-oriented data (precision data 1) and precision-oriented data (precision data 10), and machining condition data are determined for precision data 2 to 9 intermediate between the precision data 1 and 10 by proportional distribution based on those set values. Although only the two typical machining condition data are described herein, various other machining condition data, such as a jerk (acceleration variation), post-interpolation acceleration/deceleration time constant, etc., can be set in the same manner.

FIG. 3 shows commands for the indication of precision data to be designated among the precision data described above.

"G05. 1Q1" in the first block represents a block for a machining condition selection command, and "r" of "Rr" indicates the precision data to be selected from the precision data 1 to 10 shown in FIG. 2. For example, "r" is set to a small value for rough machining or to a large value for finish machining. It is to be understood here that the machining condition data, including the allowable acceleration, allowable corner speed difference, etc., may be directly commanded or parameter set values for these condition data may be set, instead of designating the precision data using the numbers 1 to 10.

While F-command in the second block is a speed command as a machining command, an actual command speed can be changed into a value, (F-command)×(override value), using an override (1 to 200%). Further, a parameter set speed may be used for a speed command, ignoring the F-command. Furthermore, the F-command in the program may be changed into a command for a modified speed.

If "G05. 1Q1R4" is commanded in the parameter setting shown in FIG. 2, for example, machining is performed with the allowable acceleration of 1,533 (=(6×2,000+3×600)/9) mm/sec$^2$ and the allowable corner speed difference of 800 (=(6×1,000+3×600)/9) mm/min set as parameters for the machining condition data. Alternatively, as described above, these data may be directly commanded or parameter set values corresponding thereto may be set. Although the precision data can be easily commanded by this machining condition selecting function, however, the appropriate machining error level and machining time for each precision data cannot be ascertained.

SUMMARY OF THE INVENTION

Accordingly, in consideration of the above problems of the prior art, an object of the present invention is to provide a numerical controller comprising a machining time prediction unit, which determines a predicted machining time by simulation, and a machining error prediction unit, which determines a predicted machining error by simulation, where precision data and speed data are designated as machining time/machining error prediction data and a machining program is designated. Another object of the invention is to provide a numerical controller in which a plurality of predicted machining times and a plurality of predicted machining errors are determined based on these designated precision data and speed data, and the shortest predicted machining time within a preset machining error tolerance is determined based on the predicted machining times and the predicted machining errors.

A numerical controller according to the present invention drivingly controls a machine tool which machines a workpiece based on a machining program. The numerical controller comprises a designation unit for designating speed data for giving a machining speed and precision data for giving a machining precision, a simulation unit which determines a command position point sequence and a servo position point sequence for each processing period by simulation, using the speed data and the precision data designated for the machining program by the designation unit, a machining time prediction unit which determines a predicted machining time during which the workpiece is machined in the simulation unit, and a machining error prediction unit which determines a predicted machining error caused when the workpiece is machined using the command position point sequence and the servo position point sequence determined by the simulation unit.

The machining error prediction unit may acquire the command position point sequence and the servo position point sequence for each processing period of the simulation by the simulation unit, a distance from a specific command position in the command position point sequence to the servo position point sequence or a perpendicular line drawn from the specific command position to a line segment which connects adjacent points in each servo position, whichever is shorter, may be determined to be an error in the specific command position, and the greatest of the errors in the command positions may be determined to be an error between the command position point sequence and the servo position point sequence.

The machining error prediction unit may acquire the command position point sequence and the servo position point sequence for each processing period of the simulation by the simulation unit, a distance from a specific servo position in the servo position point sequence to the command position point sequence or a perpendicular line drawn from the specific servo position to a line segment which connects adjacent points in each command position, whichever is shorter, may be determined to be an error in the specific servo position, and the greatest of the errors in the servo positions may be determined to be an error between the command position point sequence and the servo position point sequence.

The machining error prediction unit may acquire the command position point sequence and the servo position point sequence for each processing period of the simulation by the simulation unit, a distance from a specific command position in the command position point sequence to the servo position point sequence or a perpendicular line drawn from the specific command position to a line segment which connects adjacent points in each servo position, whichever is shorter, may be determined to be an error in the specific command position, the greatest of the errors in the command positions may be determined to be an error from the command position point sequence to the servo position point sequence, a distance from a specific servo position in the servo position point sequence to the command position point sequence or a perpendicular line drawn from the specific servo position to a line segment which connects adjacent points in each command position, whichever is shorter, may be determined to be an error in the specific servo position, the greatest of the errors in the servo positions may be determined to be an error from the servo position point sequence to the command position point sequence, and the greater of the error from the command position point sequence to the servo position point sequence or the error from the servo position point sequence to the command position point sequence may be determined to be an error between the command position point sequence and the servo position point sequence.

The machining time prediction unit may determine a plurality of predicted machining times based on a plurality of designated precision data, and the machining error prediction unit may determine a plurality of predicted machining errors based on a plurality of designated speed data. The precision data and the speed data for the shortest predicted machining time within a preset machining error tolerance may be determined based on the plurality of predicted machining times and the plurality of predicted machining errors thus determined.

The numerical controller may control a multi-axis machine comprising a rotary axis, the machining error prediction unit may determine a three-dimensional command position point sequence and a three-dimensional servo position point sequence of a tool center point position based on the command position point sequence and the servo position point sequence, and the error between the command position point sequence and the servo position point sequence may be determined with the three-dimensional command position point sequence and the three-dimensional servo position point sequence used as the command position point sequence and the servo position point sequence, respectively.

The precision data may be given by machining condition data based on an allowable acceleration or an allowable corner speed difference.

According to the present invention, there may be provided a numerical controller comprising a machining time prediction unit, which determines a predicted machining time by simulation, and a machining error prediction unit, which determines a predicted machining error by simulation, where precision data and speed data are designated as machining time/machining error prediction data and a machining program is designated. In the numerical controller, a plurality of predicted machining times and a plurality of predicted machining errors are determined based on these designated precision data and speed data, and the shortest predicted machining time within a preset machining error tolerance is determined based on a plurality of predicted machining times and a plurality of predicted machining errors.

BRIEF DESCRIPTION OF THE DRAWINGS

The above and other objects and features of the present invention will be obvious from the ensuing description of embodiments with reference to the accompanying drawings, in which:

FIG. 14 is a table showing predicted machining times and predicted machining errors determined based on precision data and speed data;

FIG. 17 is a block diagram schematically showing a configuration of one embodiment of the numerical controller comprising the machining time prediction unit and machining error prediction unit according to the present invention.

DETAILED DESCRIPTION OF THE PREFERRED EMBODIMENTS

First, features of the present invention will be described with reference to FIG. 4.

Figures 3, 4:
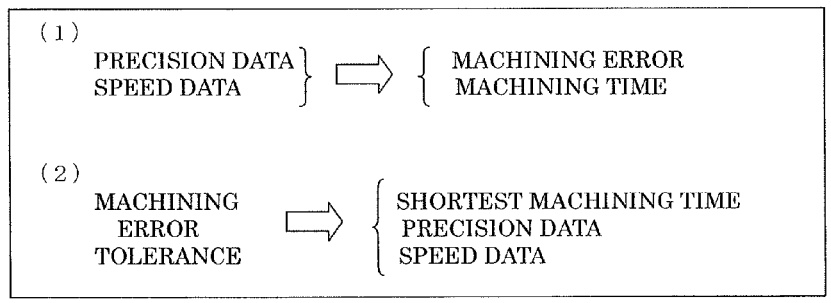
FIG. 3 is a diagram illustrating program commands including a command for the selection of precision data to be designated.
FIG. 4 is a diagram illustrating features of the present invention.

The present invention is intended to simulate machining errors and machining times to be predicted for one or more sets of speed data and precision data, and to estimate machining precisions(machining errors) and machining times for workpieces to be machined according to given speed data and precision data (see (1) of FIG. 4) and machining speeds (speed data) and machining conditions (precision data) to enable machining of workpieces with precisions within a machining error tolerance in a shortest machining time (see (2) of FIG. 4).

According to the present invention, errors to be evaluated include simulated errors from servo positions to command positions and from command positions to servo positions. In this way, the errors can be predicted more accurately.

In these circumstances, the predicted machining errors and times can be determined by simulation before actual machining, based on the estimation of the speed data and precision data ((1) of FIG. 4), so that production planning can be made more easily. Further, a machine tool can be operated more efficiently by minimizing the machining time, based on the estimation of the machining speeds (speed data) and machining conditions(precision data) ((2) of FIG. 4). In consequence, moreover, an effect can be obtained such that energy-saving machining can be achieved.

The following is a description of Embodiments 1 to 3.

Embodiment 1

Figure 5:
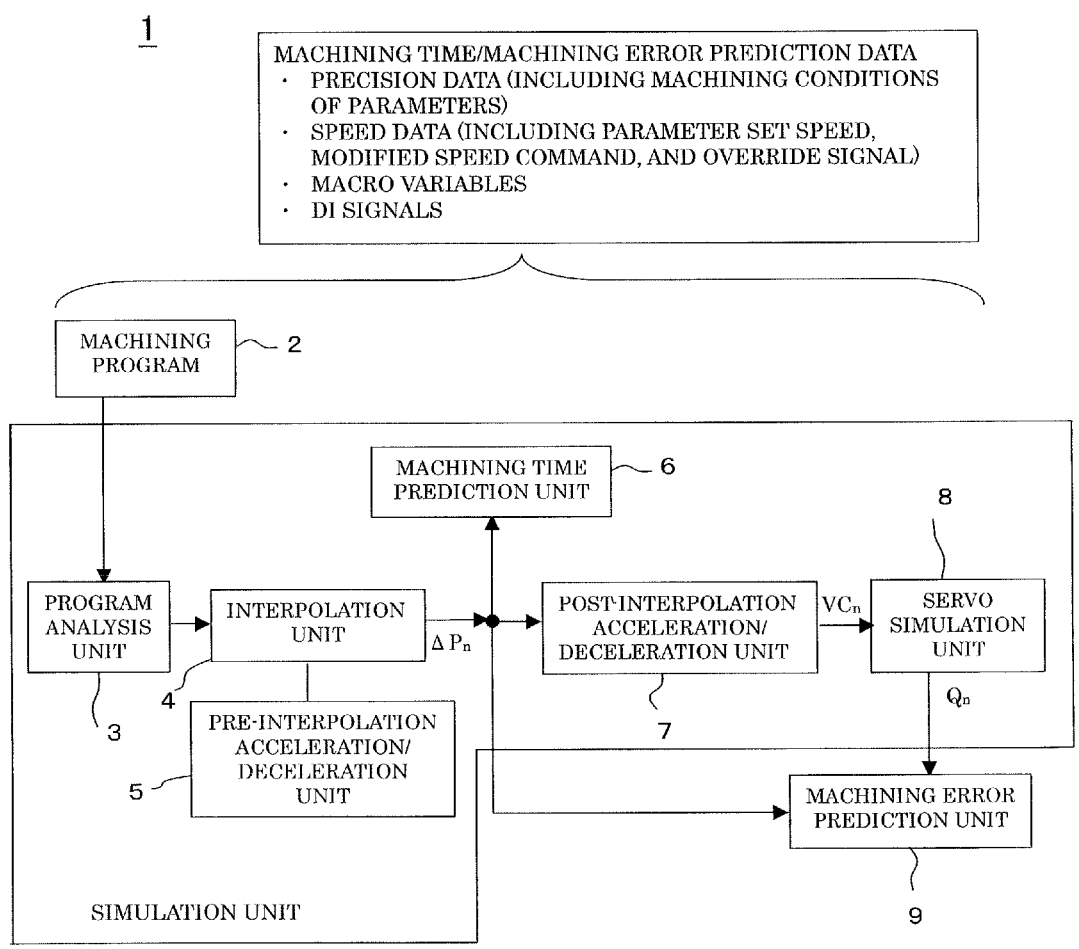
FIG. 5 is a functional block diagram of a numerical controller comprising a simulation unit, machining time prediction unit, and machining error prediction unit for a machining program according to the present invention.

FIG. 5 is a functional block diagram of a numerical controller 1 according to the present invention, comprising a machining time prediction unit and a machining error prediction unit for a machining program.

A program analysis unit 3 simulates a program analysis process for reading and analyzing a machining program 2 and creating interpolation data. An interpolation unit 4 simulates an interpolation process such that interpolation is performed according to the interpolation data and interpolation data $\Delta P_n$ are created, based on speed data created for blocks and corners between blocks by a pre-interpolation acceleration/deceleration unit 5. A post-interpolation acceleration/deceleration unit 7 simulates a post-interpolation acceleration/deceleration process such that post-interpolation acceleration/deceleration is performed for the interpolation data $\Delta P_n$ and servo position command data $VC_n$ is created by accumulating the data. The servo position command data $VC_n$ is delivered from the post-interpolation acceleration/deceleration unit 7 to a servo simulation unit 8, which creates servo position data $Q_n$ (hereinafter simply referred to as the servo position $Q_n$) as a simulation of actual servo operation based on the servo position command data $VC_n$. A simulation unit comprises the program analysis unit, interpolation unit, post-interpolation acceleration/deceleration unit, servo simulation unit, and machining time prediction unit 6 (described later).

Figure 6:
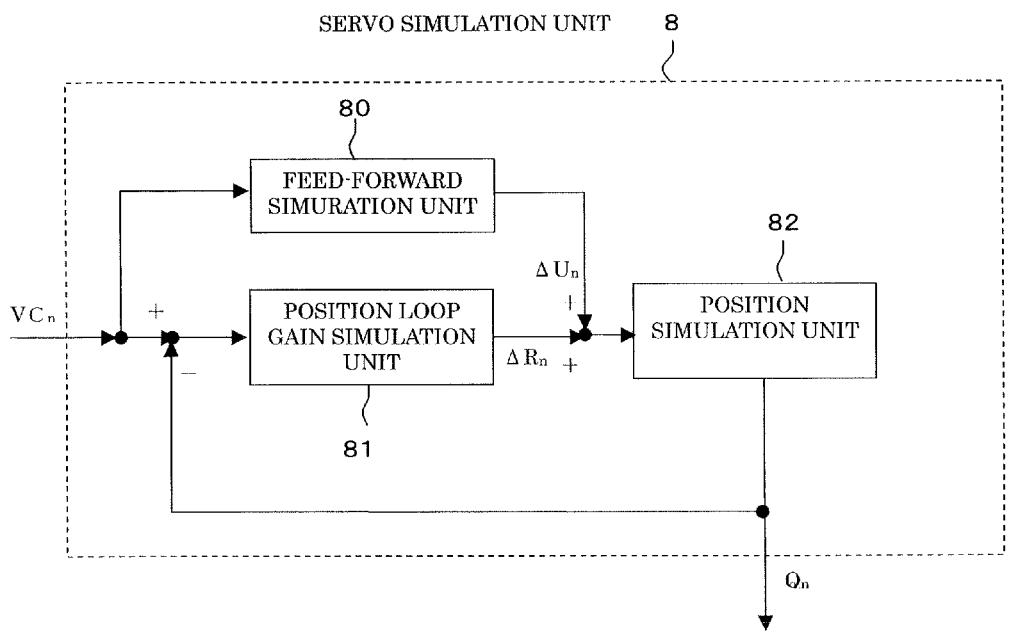
FIG. 6 is a diagram illustrating a servo simulation unit for simulating a servo operation.

The servo simulation unit 8 for simulating servo operation will now be described with reference to FIG. 6.

The servo position command data $VC_n$ is input from the post-interpolation acceleration/deceleration unit 7 to the servo simulation unit 8 with every processing period. The servo position command data $VC_n$ input to the servo simulation unit 8 is input to a feed-forward simulation unit 80. The feed-forward simulation unit 80 differentiates the servo position command data $VC_n$ and outputs the result of multiplication by a feed-forward coefficient as $\Delta U_n$.

The difference between the servo position command data $VC_n$ and a servo position (feedback data) $Q_{n-1}$ for the preceding processing period is input to a position loop gain simulation unit 81. The simulation unit 81 outputs $\Delta R_n$ obtained by multiplying the input difference by a position loop gain. Then, the sum of $\Delta U_n$ and $\Delta R_n$ is input to a position simulation unit 82 and the accumulation of the sum is obtained as the servo position $Q_n$.

Data having the subscript "$_n$" or another subscript "$_m$" (described later) is a vector having data as many as feed axes.

The processes described above are performed with reference to various machining time/machining error prediction data, such as parameters, macro variables, DI signals, etc. In these processes, moreover, servo operations are not actually performed but are all simulated.

The parameters, macro variables, DI signals, etc., of the machining time/machining error prediction data are prepared in addition to machining data of the same type. In this case, therefore, the DI signals are imaginary signal data for machining time prediction and machining error prediction.

As described above, the servo simulation unit 8 performs simulations of a delay based on the position loop gain and servo operation based on feed-forward control. Thus, the servo simulation unit 8 is provided in addition to a servo processing unit for machining. The program analysis unit 3, interpolation unit 4, pre-interpolation acceleration/deceleration unit 5, and post-interpolation acceleration/deceleration unit 7 may be provided in addition to processing units of the same types for machining. Alternatively, the processing units of the same types for machining (foreground) may be used in the background. The configuration of the servo simulation unit 8 of FIG. 6 is given by way of example only, and servo simulation may be performed by a servo simulation unit of another configuration.

Simulations for the program analysis unit 3, interpolation unit 4, pre-interpolation acceleration/deceleration unit 5, and post-interpolation acceleration/deceleration unit 7 are processed by a conventional method, which will not be described in detail. However, the processing periods of the interpolation unit 4, pre-interpolation acceleration/deceleration unit 5, and post-interpolation acceleration/deceleration unit 7 for the simulation may be longer than those for machining. Even if the processing periods of the interpolation unit, pre-interpolation acceleration/deceleration unit, and post-interpolation acceleration/deceleration unit for machining are 1 msec, for example, those of the interpolation unit 4, pre-interpolation acceleration/deceleration unit 5, and post-interpolation acceleration/deceleration unit 7 for machining time prediction and machining error prediction for the simulation may be assumed to be as long as about 8 msec. In this way, the machining time prediction and machining error prediction can be performed more quickly. Because rogher calculation for 8 msec than that for 1 msec can be performed quickly for the simulation.

Figure 7:
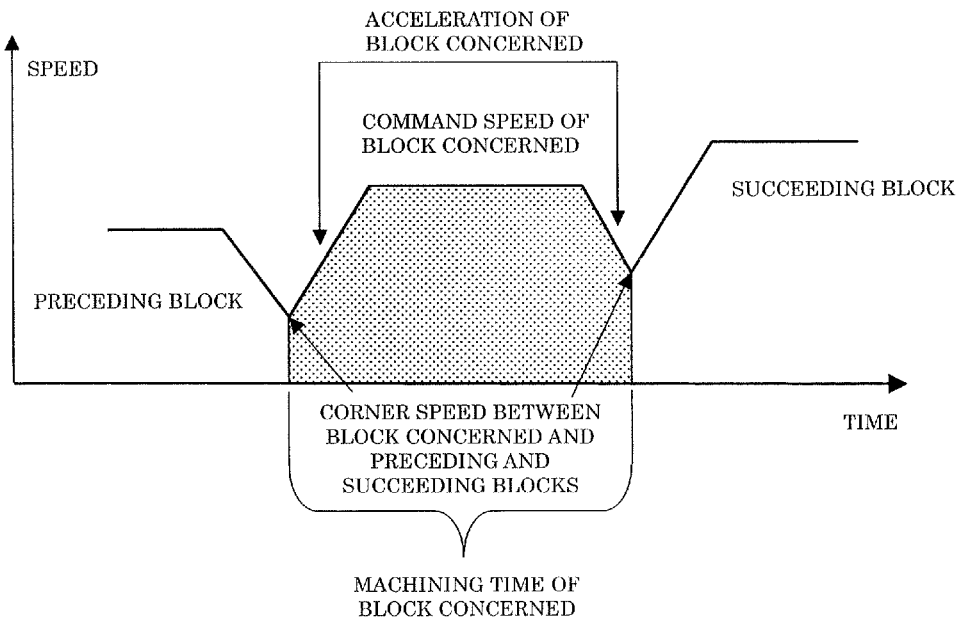
FIG. 7 is a diagram illustrating machining time for a block concerned.

The machining time prediction unit 6 determines a predicted machining time Te based on the interpolation data created by the interpolation unit. For example, calculation for the machining time prediction may be performed based on the form of the interpolation data, or the machining time may be predicted by counting the number of interpolations. In the case of linear acceleration/deceleration, for example, the interpolation data form of each block for the calculation is such that an upper limit is defined by the command speed of the block concerned and accelerations of the block concerned, created by the pre-interpolation acceleration/deceleration unit 5, are given by oblique lines, as shown in FIG. 7. Further, speeds at troughs are regarded as corner speeds for the block created by the pre-interpolation acceleration/deceleration unit, and the area as a command block length. Thus, the predicted machining time for the block concerned can be calculated.

Figure 8:
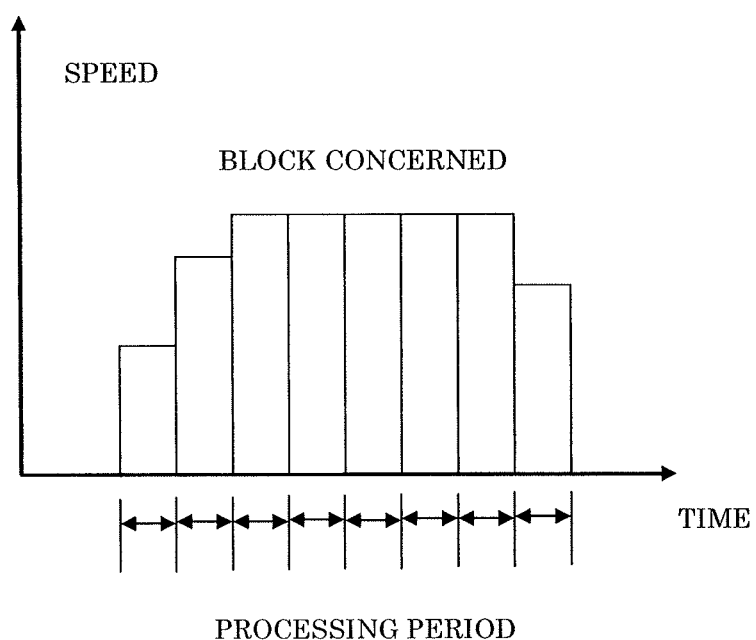
FIG. 8 is a diagram illustrating interpolation data for each processing period.

More specifically, each interpolation data $\Delta P_n$ has a rectangular shape for each processing period, as shown in FIG. 8. In general, however, the processing time of the block concerned is sufficiently longer than the processing period, so that FIG. 7 shows an entire form that comprises the individual rectangular shapes connected to one another. The prediction by the counting of the number of interpolations is a method in which the machining time is determined by multiplying the frequency (number of interpolation data $\Delta P_n$) of creation of the interpolation data $\Delta P_n$ from the interpolation unit 4 by the processing period. Alternatively, the machining time may be determined by multiplying the count number of other data created in the simulation unit, such as the servo position command data $VC_n$ created by the post-interpolation acceleration/deceleration unit, servo position $Q_n$ created by the servo simulation unit, etc., by the processing period. Since these methods for machining time prediction are conventional technologies, they will not be described in detail.

A machining error prediction unit 9 predicts, as an error, the difference between an interpolation path based on the interpolation data $\Delta P_n$ and a delay path based on post-interpolation acceleration/deceleration and servo operation simulation. As described above, the machining error prediction unit 9 receives the servo position $Q_n$ from the servo simulation unit 8 and also receives the interpolation data $\Delta P_n$, as output data, from the interpolation unit 4. The machining error prediction unit 9 determines a command position $P_n = P_{n-1} + \Delta P_n$ by accumulation. In this way, a command position point sequence $P_n$ and servo position point sequence $Q_n$ are created. The point sequence $Q_n$ includes more points than the point sequence $P_n$ by the number of processing periods for the delay by the post-interpolation acceleration/deceleration and servo operation simulation. In the description to follow, therefore, the alternative subscript "$_m$" will be used to represent $Q_m$ (m=0, 1, 2, . . . , me) for $P_n$ (n=0, 1, 2, . . . ne). Symbols ne and me designate the numbers of the final points in the point sequences, individually. In general, there is a relationship ne<me.

Figure 9:
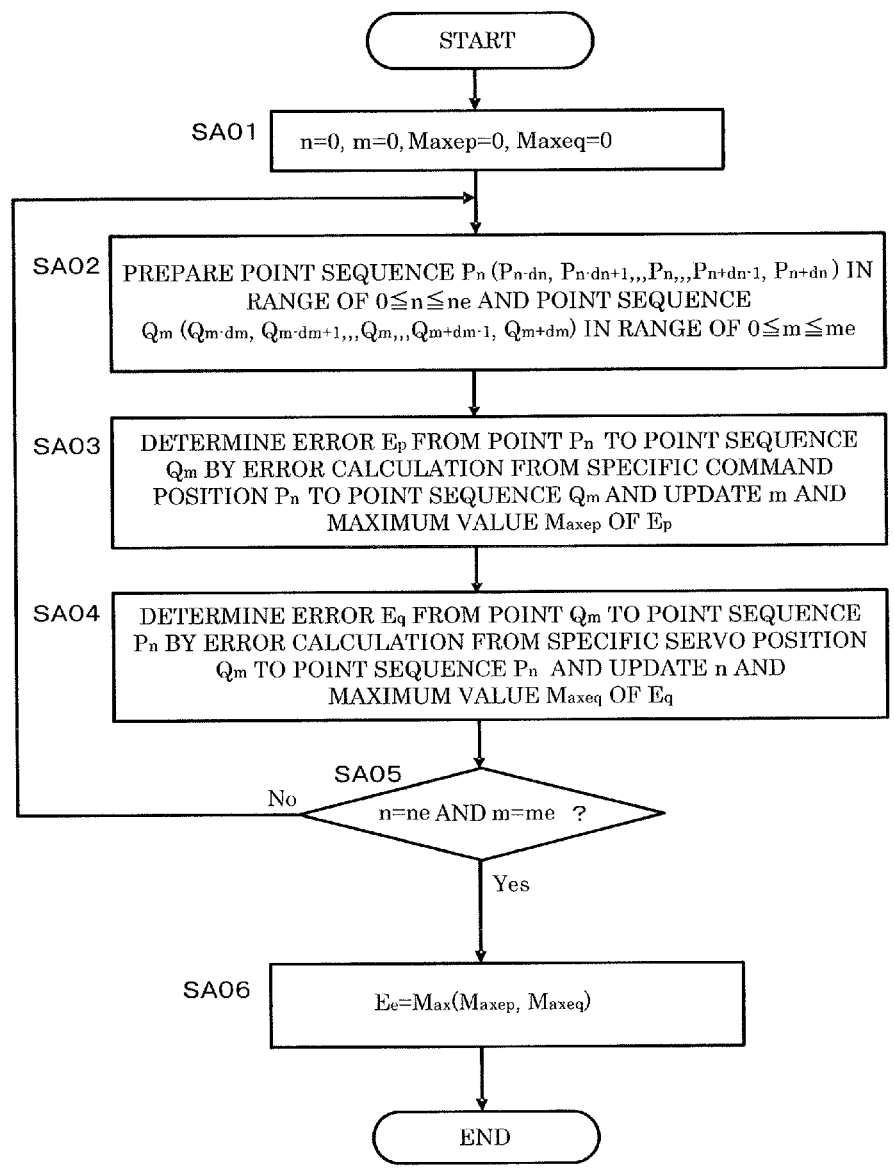
FIG. 9 is a flowchart illustrating processing in the machining error prediction unit.

The processing of the machining error prediction unit 9 will now be described with reference to the flowchart of FIG. 9.

[Step SA01] Conditions n=0, m=0, Maxep=0, and Maxep=0 are given.

[Step SA02] The point sequence $P_n$ is prepared for (n−dn≤n≤n+dn) according to a number dn previously set to define its range. If a range (0≤n≤ne) is exceeded by (n−dn≤n≤n+dn), only the point sequences within the range (0≤n≤ne) are provided. Likewise, the point sequence $Q_m$ is prepared for (m−dm≤m≤m+dm) according to a number dm previously set to define its range. If a range (0≤m≤me) is exceeded by (m−dm≤m≤m+dm), only the point sequences within the range (0≤m≤ne) are provided.

[Step SA03] Error calculations from a specific command position $P_n$ in the command position point sequence $P_n$ to the point sequence $Q_m$ are performed to obtain the errors Ep from the specific command position $P_n$ to the point sequence $Q_m$. Further, the maximum value Maxep of the error Ep and m are updated. This step will be described further in detail with reference to the flowchart of FIG. 11.

[Step SA04] Error calculations from a specific servo position $Q_m$ in the servo position point sequence $Q_m$ to the point sequence $P_n$ are performed to obtain the errors Eq from the specific servo position $Q_m$ to the point sequence $P_n$. Further, the maximum value Maxeq of the error Eq and n are updated.

[Step SA05] It is determined whether or not n=ne and m=me are established. If the decision is No, the program returns to Step SA02. If the decision is Yes, the program proceeds to Step SA06.

[Step SA06] The maximum value Maxep or Maxeq, whichever is greater, is determined to be a predicted machining error Ee between the command position point sequence $P_n$ and servo position point sequence $Q_m$, whereupon the processing ends.

Figure 10:
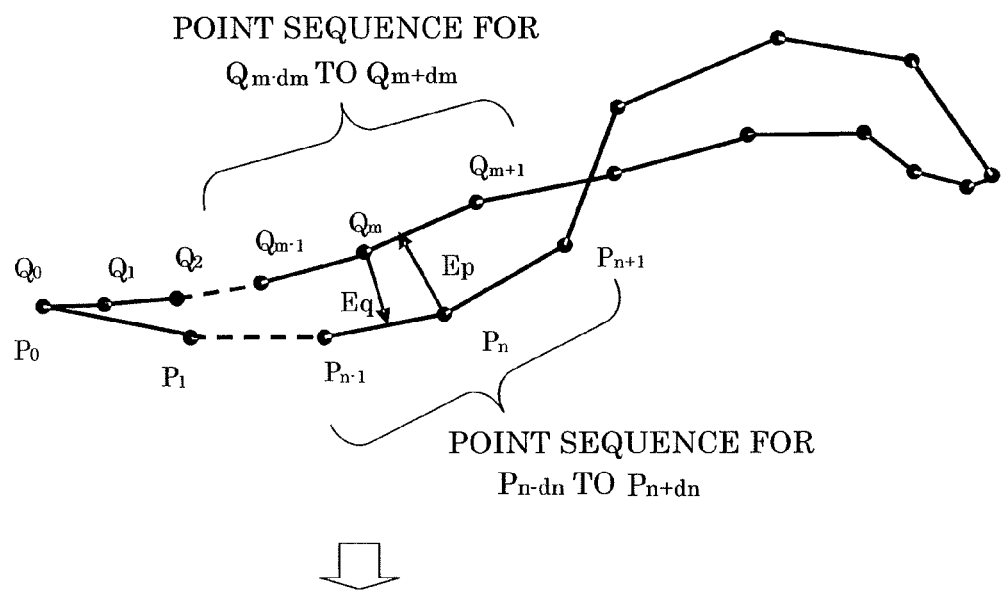
FIG. 10 is a diagram illustrating the process of Step SA06 in the flowchart of FIG. 9.

Specifically, regarding the command position point sequence $P_n$ and servo position point sequence $Q_m$, the errors Ep from the specific command position $P_n$ to the point sequence $Q_m$ and the error Eq from the specific servo position $Q_m$ to the point sequence $P_n$ are calculated for the ranges (n−dn≤n≤n+dn) and (m−dm≤m≤m+dm). The numbers n and m are updated as this calculation is performed. The maximum value Maxep (=Max(Ep)) of the error Ep and the maximum value Maxeq (=Max(Eq)) of the error Eq are obtained, and the maximum value Maxep or Maxeq, whichever is greater, is determined to be the predicted machining error Ee (=Max (Maxep, Maxeq)) between the command position point sequence $P_n$ and servo position point sequence $Q_m$. Thus, Max(Ep) represents the maximum of a plurality of errors Ep, Max(Eq) represents the maximum of a plurality of errors Eq, and Max(Maxep, Maxeq) represents the greater of the maximum values Maxep and Maxeq, as shown in FIG. 10.

In Step SA03, error calculations from a specific command position $P_n$ to the point sequence $Q_m$ are performed, and the maximum value Maxep of the error Ep is created. Likewise, in Step SA04, error calculations from a specific servo position $Q_m$ to the point sequence $P_n$ are performed, and the maximum value Maxeq of the error Eq is created. Only one of Steps SA03 and SA04 may be performed, instead of executing both of these steps.

In the aforementioned technique disclosed in Japanese Patent Application Laid-Open No. 2011-60016, only the calculation corresponding to Step SA04 is performed. As mentioned before, however, it is to be noted that, in the case of the patent document, the calculation is performed for the actual position obtained by actually operating a drive shaft (servo), whereas, in the case of the present invention, the calculation is performed for the position obtained by simulation.

It has been described above that an error is calculated after the complete command position point sequence $P_n$ (n=0, 1, 2, ..., ne) and servo position point sequence $Q_m$ (m=0, 1, 2, ..., me) are created. Alternatively, however, a similar calculation may be performed by obtaining the necessary command position $P_n$ (n−dn≤n≤n+dn) and servo position $Q_m$ (m−dm≤m≤m+dm) while reading the machining program block by block as required. In this case, the entire point sequences $P_n$ and $Q_m$ need not be created in advance, so that the memory capacity can be saved.

The command position $P_n$, specific command position $P_n$, command position point sequence $P_n$, and point sequence $P_n$, which are all designated by symbol $P_n$, are terms that have slightly different meanings. The command position $P_n$ represents a single command position. The specific command position $P_n$ represents one specific or noticeable command position. The command position point sequence $P_n$ and the point sequence $P_n$ each represent a command point sequence $P_n$ including a plurality of command positions. This also applies to the case of $Q_m$.

Figure 11:
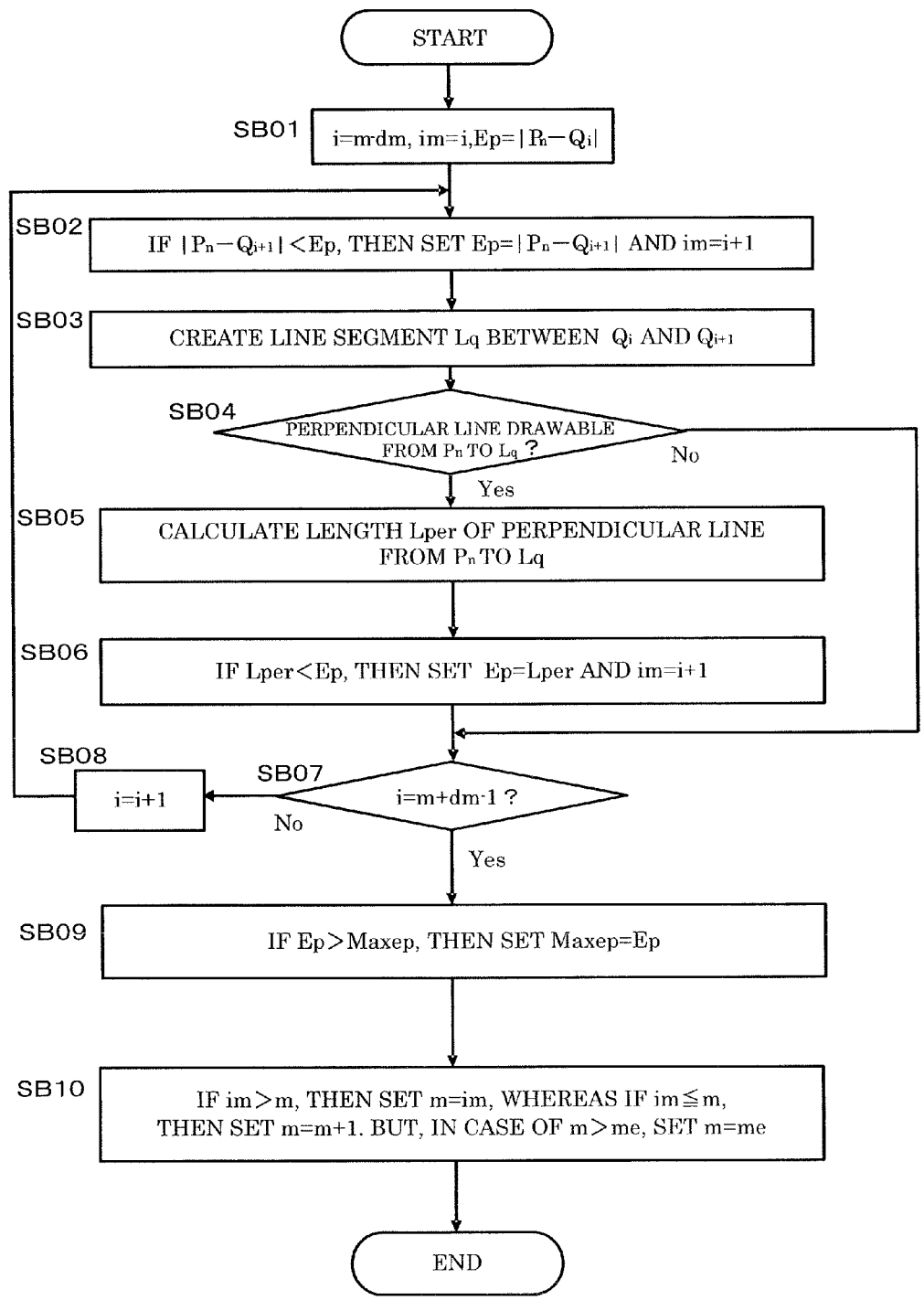
FIG. 11 is a flowchart illustrating the process of Step SA03 in the flowchart of FIG. 9 further in detail.

Step SA03 in the flowchart of FIG. 9 will be further described with reference to the flowchart of FIG. 11.

[Step SB01] Initial values of i, im and EP are set as i=m−dm, im=i, and Ep=|$P_n$−$Q_i$|. Regarding the value i, i=m−dm is given in general, but if the range (0≤m≤me) is exceeded by (m−dm≤m≤m+dm) for $Q_m$, as described above in connection with the description of Step SA02 in the flowchart of FIG. 9, however, i is set to the smallest value within the range where (m−dm≤m≤m+dm) and (0≤m≤me) overlap with each other.

[Step SB02] A length |$P_n$−$Q_{i+1}$| between $P_n$ and $Q_{i+1}$ is calculated. If |$P_n$−$Q_{i+1}$| is smaller than Ep, Ep=|$P_n$−$Q_{i+1}$| and im=i+1 are set, and the then value i+1 is stored.

[Step SB03] A line segment Lq that connects $Q_i$ and $Q_{i+1}$ is created.

[Step SB04] It is determined whether or not a perpendicular line can be drawn from $P_n$ to the line segment Lq. If the perpendicular line cannot be drawn, the program proceeds to Step SB07. If the perpendicular line can be drawn, the program proceeds to Step SB05.

[Step SB05] A length Lper of the perpendicular line drawn from $P_n$ to the line segment Lq is calculated.

[Step SB06] If Lper is smaller than Ep, Ep=Lper and im=i+1 are set, and the then value i+1 is stored.

Figures 12, 13:
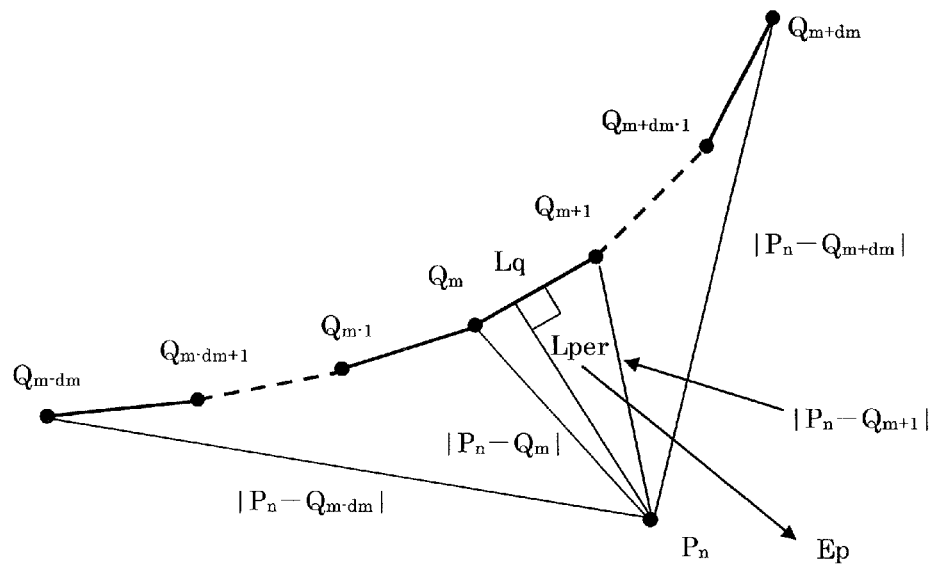
FIG. 12 is a diagram illustrating how to determine an error of a point sequence $P_n$.
FIG. 13 shows an example of a predicted machining time and predicted machining error.

[Step SB07] It is determined whether or not i=m+dm−1 is established. If the decision is Yes, the program proceeds to Step SB09. If the decision is No, the program returns to Step SB08. Here, whether or not i=m+dm−1 is established is determined in general. If the range (0≤m≤me) is exceeded by (m−dm≤m≤m+dm) for $Q_m$, as described above in connection with the description of Step SA02 in the flowchart of FIG. 9, however, it is determined whether or not i is equal to a value one smaller than the greatest value within the range where (m−dm≤m≤m+dm) and (0≤m≤me) overlap with each other. Consequently, the shorter of perpendicular lines drawn from $P_n$ to line segments that connect adjacent points in the point sequence $Q_m$ (m−dm≤m≤m+dm) can be obtained as Ep. Thus, as shown in FIG. 12, the value Ep is set as an error between the value $P_n$ and the point sequence $Q_m$ (m−dm≤m≤m+dm).

[Step SB08] One is added to i to update i, whereupon program returns to Step SB02 and the processing is continued.

[Step SB09] If Ep is greater than Maxep, Maxep=Ep is set, whereby the maximum value Maxep of Ep is updated.

[Step SB10] If im is greater than m, m=im is set. If im is not greater than m, m=m+1 is set to update m. If m exceeds the maximum value me, however, m is regarded as equal to me, whereupon the processing ends.

The predicted machining time Te during which the workpiece will be machined and predicted machining error Ee caused when the workpiece will be machined can be determined if the machining program is designated and executed by giving the precision data and speed data, which are described in connection with the machining condition selecting function (see FIG. 2), to the numerical controller 1 of FIG. 5 comprising the machining time prediction unit 6 and machining error prediction unit 9. The speed data may be given by various methods, e.g., by applying an override as a DI signal, applying the parameter set speed based on a parameter, or changing the F-command in the program into a modified speed command.

It is to be understood that only a part of the machining program may be regarded as an object of the machining time prediction and the machining error prediction. For example, only a mode part of a cutting command (G01, G02, G03, etc.) may be used as an object to be predicted. Alternatively, only a block of the machining program to be cut by a certain tool or only a certain process part may be used as an object to be predicted.

FIG. 13 shows an example in which the predicted machining time Te and predicted machining error Ee are obtained with the precision data at 9 and the speed data (override) at 50%. The predicted machining time Te (minutes) and predicted machining error Ee (mm) are entered in upper and lower columns, respectively. With the precision data and speed data (override) designated in this manner, the predicted machining time and predicted machining error can be simultaneously determined by simulation.

Embodiment 2

In Embodiment 2, conditions for the shortest machining time are determined within the machining error tolerance.

A table shown in FIG. 14 is created from predicted machining times Te and predicted machining errors Ee which are determined based on some of the converted precision data and speed data.

In this case, parameter set speeds are given as the speed data. FIG. 14 shows predicted machining times and predicted machining errors represented by those data in five boxed areas, i.e., (precision data: 1, speed data: 1,000 ram/min), (precision data: 10, speed data: 1,000 ram/min), (precision data: 5, speed data: 2,000 mm/min), (precision data: 1, speed data: 3,000 mm/min), and (precision data: 10, speed data: 3,000 mm/min). The predicted machining time Te (minutes) and predicted machining error Ee (mm) are entered in upper and lower columns, respectively, of each boxed area. Data in the other areas are obtained by interpolating the boxed data through proportional distribution. Naturally, data in some areas other than the five boxed area or in all the areas may be simulated.

If the preset machining error tolerance is 0.05 mm, data in slashed areas are excluded because they exceed the tolerance. Consequently, data for the shortest predicted machining time within the machining error tolerance can be easily determined to be (precision data: 9, speed data: 3,000 mm/min).

Embodiment 3

In the case of a multi-axis machine having rotary axes (X-, Y-, Z-, B-, and C-axes) in a tool head and tables, a machining error prediction unit 9 can determine a three-dimensional command position point sequence $P_n'$ ($P_{Xn}'$, $P_{Yn}'$, $P_{Zn}'$) and a three-dimensional servo position point sequence $Q_m'$ ($Q_{Xm}'$, $Q_{Ym}'$, $Q_{Zm}'$) of a tool center point position, based on command position point sequences $P_n$ ($P_{Xn}$, $P_{Yn}$, $P_{Zn}$, $P_{Bn}$, $P_{Cn}$) and servo position point sequences $Q_m$ ($Q_{Xm}$, $Q_{Ym}$, $Q_{Zm}$, $Q_{Bm}$, $Q_{Cm}$) and a tool length, and predict a machining error by handling the determined command position point sequences and servo position point sequences in the same manner as the command position point sequences and servo position point sequences according to the first or second embodiments.

Although the subscripts B and C are used to represent positions of the assumed B- and C-axes of the multi-axis machine, the machine may have other rotary axes, A- and B-axes or A- and C-axes. Further, multi-axis machines include a five-axis machine with a rotary tool head, multi-axis machine with rotary table, and mixed-type five-axis machine (with a rotary tool head and rotary table). In each of these machines, the tool center point position is given by the three-dimensional command position point sequences $P_n'$ ($P_{Xn}'$, $P_{Yn}'$, $P_{Zn}'$) and the three-dimensional servo position point sequences $Q_m'$ ($Q_{Xm}'$, $Q_{Ym}'$, $Q_{Zm}'$) of a tool center point position in a coordinate system of a table on which a workpiece to be machined is placed. In the case of the multi-axis machine with rotary table, the coordinate system of a table on which a workpiece to be machined is placed is a coordinate system that rotates on and together with the rotating table.

Figure 15:
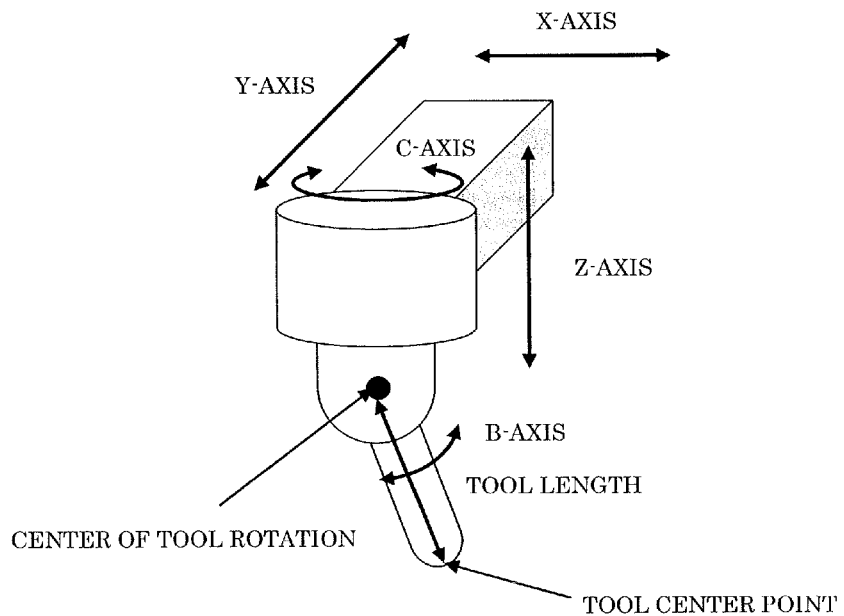
FIG. 15 is a schematic view of a five-axis machine with a rotary tool head.
Figure 16:
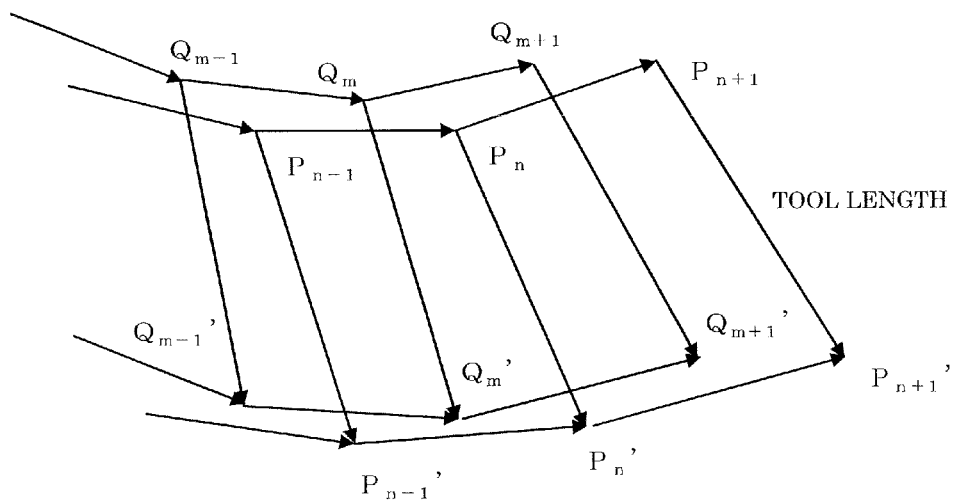
FIG. 16 is a diagram illustrating relationships between $P_n$ and $Q_m$ and between $P_n'$ and $Q_m'$ in the five-axis machine.

FIG. 15 is a schematic view of a tool head section of a five-axis machine with a rotary tool head, and FIG. 16 is a diagram illustrating relationships between $P_n$ and $Q_m$ and between $P_n'$ and $Q_m'$ in the five-axis machine.

FIG. 17 is a block diagram schematically showing a configuration of one embodiment of the numerical controller comprising the machining time prediction unit and machining error prediction unit according to the present invention.

Figures 1, 2:
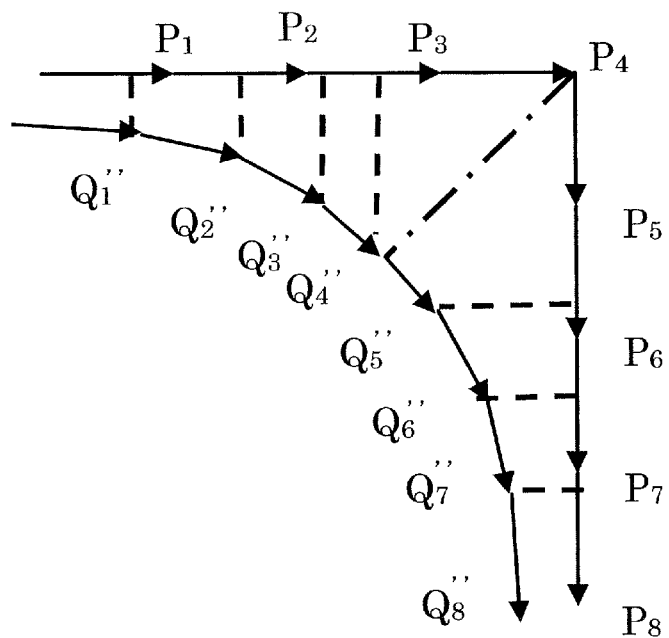
FIG. 1 is a diagram for illustrating a technique related to an error of an actual position relative to a command path, disclosed in a prior art document.
FIG. 2 is a diagram illustrating a machining condition selecting function according to the prior art.

The numerical controller 1 has the machining condition selecting function described with reference to FIG. 2. A CPU 111 for use as a processor controls the entire numerical controller 1 according to a system program stored in a ROM 112. A RAM 113 is loaded with various data or input and output signals. Various data stored in a nonvolatile memory 114 are saved as they are even after power is cut off. A graphic control circuit 115 converts digital signals to display signals and delivers them to a display device 116. A keyboard 117 is a means with numeric keys and character keys for inputting various set data.

An axis control circuit 118 receives move commands for the individual axes from the CPU 111 and outputs them to a servo amplifier 119. On receiving the move commands, the amplifier 119 drives servomotors (not shown) of a machine tool 20. These constituent elements are connected to one another by a bus 121. A programmable machine controller (PMC) 122 receives a T-function signal (tool selection command) and the like through the bus 121 during execution of the machining program. Then, the PMC 122 processes this signal according to a sequence program and outputs it as an operation command, thereby controlling the machine tool 20. On receiving a state signal from the machine tool 20, moreover, the PMC 122 transfers a necessary input signal to the CPU 111. Further, the bus 121 is connected with a software key 123, whose function changes according to the system program or the like, and an interface 124 through which NC data is delivered to an external device such as a storage device. The software key 123, along with the display device 116 and the keyboard 117, is disposed on a display/manual data input (MDI) panel 125.

The invention claimed is:

1. A numerical controller for drivingly controlling a machine tool which machines a workpiece based on a machining program, the numerical controller comprising:

a designation unit for designating speed data for giving a machining speed and precision data for giving a machining precision;

a simulation unit which determines a command position point sequence and a servo position point sequence for each processing period by simulating a program analysis process, an interpolation process, a post-interpolation acceleration/deceleration process, and a servo operation, using the speed data and the precision data designated for the machining program by the designation unit;

a machining time prediction unit which determines a predicted machining time during which the workpiece will be machined in the simulation unit; and a machining error prediction unit which determines a predicted machining error caused when the workpiece will be machined using the command position point sequence and the servo position point sequence determined by the simulation unit.

2. The numerical controller according to claim 1, wherein
the machining error prediction unit acquires the command position point sequence and the servo position point sequence for each processing period of the simulation by the simulation unit, a distance from a specific command position in the command position point sequence to the servo position point sequence or a perpendicular line drawn from the specific command position to a line segment which connects adjacent points in each servo position, whichever is shorter, is determined to be an error in the specific command position, and the greatest of the errors in the specific command positions is determined to be an error between the command position point sequence and the servo position point sequence.

3. The numerical controller according to claim 1, wherein
the machining error prediction unit acquires the command position point sequence and the servo position point sequence for each processing period of the simulation by the simulation unit, a distance from a specific servo position in the servo position point sequence to the command position point sequence or a perpendicular line drawn from the specific servo position to a line segment which connects adjacent points in each command position, whichever is shorter, is determined to be an error in the specific servo position, and the greatest of the errors in the specific servo positions is determined to be an error between the command position point sequence and the servo position point sequence.

4. The numerical controller according to claim 1, wherein
the machining error prediction unit acquires the command position point sequence and the servo position point sequence for each processing period of the simulation by the simulation unit, a distance from a specific command position in the command position point sequence to the servo position point sequence or a perpendicular line drawn from the specific command position to a line segment which connects adjacent points in each servo position, whichever is shorter, is determined to be an error in the specific command position, the greatest of the errors in the specific command positions is determined to be an error from the command position point sequence to the servo position point sequence, a distance from a specific servo position in the servo position point sequence to the command position point sequence or a perpendicular line drawn from the specific servo position to a line segment which connects adjacent points in each command position, whichever is shorter, is determined to be an error in the specific servo position, the greatest of the errors in the specific servo positions is determined to be an error from the servo position point sequence to the command position point sequence, and the greater of the error from the command position point sequence to the servo position point sequence and the error from the servo position point sequence to the command position point sequence is determined to be an error between the command position point sequence and the servo position point sequence.

5. The numerical controller according to claim 1, wherein the machining time prediction unit and the machining error prediction unit determine a plurality of predicted machining times and a plurality of predicted machining errors based on a plurality of designated precision data and a plurality of designated speed data, and determine the precision data and the speed data for the shortest predicted machining time within a preset machining error tolerance, based on the plurality of predicted machining times and the plurality of predicted machining errors determined thereby.

6. The numerical controller according to claim 1, wherein
the numerical controller controls a multi-axis machine comprising a rotary axis, the machining error prediction unit determines a three-dimensional command position point sequence and a three-dimensional servo position point sequence of a tool center point position based on the command position point sequence and the servo position point sequence, and the error between the command position point sequence and the servo position point sequence is determined with the three-dimensional command position point sequence and the three-dimensional servo position point sequence used as the command position point sequence and the servo position point sequence, respectively.

7. The numerical controller according to claim 1, wherein the precision data is given by machining condition data based on an allowable acceleration or an allowable corner speed difference.

* * * * *